United States Patent [19]

Weil

[11] Patent Number: 4,759,981
[45] Date of Patent: Jul. 26, 1988

[54] WELDING BACKUP TAPE ASSEMBLY
[75] Inventor: Thomas L. Weil, Elverson, Pa.
[73] Assignee: Davlyn Manufacturing Co., Inc., Chester Springs, Pa.
[21] Appl. No.: 1,713
[22] Filed: Jan. 9, 1987
[51] Int. Cl.⁴ .......................... B23K 5/22; B23K 9/02; B23K 31/02; C09U 7/02
[52] U.S. Cl. .................................... 428/343; 228/50; 228/216; 219/160; 428/102; 428/294; 428/377; 428/379
[58] Field of Search .................. 228/50, 216; 219/160; 428/343

[56] References Cited
U.S. PATENT DOCUMENTS

| | | | |
|---|---|---|---|
| 3,365,566 | 1/1968 | Kuder | 228/50 X |
| 3,494,020 | 2/1970 | Cornell | 228/50 X |
| 4,150,775 | 4/1979 | Roden et al. | 228/50 |
| 4,182,951 | 1/1980 | Kuder | 228/50 |
| 4,295,593 | 10/1981 | Kensrue | 228/50 |
| 4,344,556 | 8/1982 | Knapp | 228/50 |

Primary Examiner—George F. Lesmes
Assistant Examiner—D. R. Zirker
Attorney, Agent, or Firm—Panitch Schwarze Jacobs and Nadel

[57] ABSTRACT

A welding backup tape assembly includes a flexible, elongated, heat resistant ribbon, such as a metal foil strip, with a flexible, elongated, heat resistant, fibrous rope having a flexible reinforcing core, preferably metallic, attached to one major side of the ribbon, suggestedly by stitching with a glass fiber thread, to form a substantially unitary assembly. Pressure sensitive adhesive layers are applied to the ribbon on either side of the fibrous rope to allow that side of the assembly to be adhered to the weldable workpiece. In the preferred embodiment, the fibrous rope is formed by a knitted, multistrand stainless steel wire core supporting a sheath of knitted, texturized, untwisted fiberglass yarns. Untexturized, low or no twist, continuous, glass fiber thread is used to stitch the rope to the ribbon.

15 Claims, 1 Drawing Sheet

WELDING BACKUP TAPE ASSEMBLY

FIELD OF THE INVENTION

The present invention relates to electric welding and, more particularly, to an improvement in welding backup devices.

BACKGROUND OF THE INVENTION

Welding backup assemblies provide a variety of functions in electric welding processes. Backup assemblies may be used to seal an opposing side of the workpiece to prevent or diminish oxidation of the workpiece. Backup assemblies may also be used to catch molten metal, thereby assisting in the welding process. Backup assemblies may further be used to roughly shape or smooth the backside of the weld, thereby eliminating or substantially reducing post-weld treatments, such as grinding.

"Backing" or "backing-up" or similar words are intended to refer to the position of a welding tape assembly adjoining and covering one side of a joint to be welded opposite another side of the joint on which an active welding electrode is applied.

U.S. Pat. No. 3,365,566 describes several welding backup tape assembly variations. In one embodiment, an elongated continuous piece of metallic foil is provided with adhesive surfaces along its edges on one side to allow the foil to be adhered to a workpiece with a clean, central portion of the foil backing the joint to be welded. Another embodiment is provided by a flexible layer or ribbon of a heat-resistant material, such as glass cloth, having an adhesive surface and a narrower thin metallic layer or foil, preferably a copper or aluminium alloy, adhered to the adhesive surface on one side of the ribbon, centrally disposed on the ribbon to expose edge portions of the adhesive surface of the glass cloth layer for adhering the tape assembly with the metallic layer or foil backing the joint to be welded. In yet another embodiment, the flexible metallic strip and glass cloth are reversed.

One particular embodiment of U.S. Pat. No. 3,365,566, depicted in FIG. 14, is particularly relevant to the subject invention. In that embodiment, a filler in the form of a cord is provided between an adhesive surface of a flexible metallic strip and an overlying woven glass fiber strip of narrower width, adhered to the surface of the metal strip to provide additional backup. The precise manner of retaining the cord between the layers is not disclosed. While the cord may also be adhered to the metallic strip with the woven glass fiber strip, there does not appear to be any connection between the cord and either strip, other than friction and possibly an adhesive, which would assist in keeping the assembly together if it were to be grasped by the cord for removal. Also, the provision of the woven glass fiber strip to protect and/or attach the cord to the metal foil strip increases the number of components and thus the cost of the assembly.

Another known welding backup tape assembly includes an elongated metal foil strip supporting a bead of ceramic (e.g., aluminum oxide) granular elements conglomerated by means of a binder. Peel away strips protect a pressure sensitive adhesive on the foil to either side of the granular bead. It also has some drawbacks. First, the granular bead is moisture absorbing. The assembly must be stored in a poly bag to prevent moisture pick up and must be dried for hours at an elevated temperature before use if the assembly becomes moist from exposure. Some portion of the surface ceramic grains are usually trapped in the surface of the weld. This may necessitate grinding to remove the grains and/or provide a smooth surface. Lastly, the binder may smoke under certain welding conditions from the heat generated. This may be an irritant to the welders and may obscure their vision of the workpiece.

Lastly, another type of welding backup tape assembly is disclosed in U.S. Pat. No. 4,182,951. The assembly of this patent includes an adhesive coated mounting strip, preferably of a metallic foil, which receives and retains one or more molded ceramic elements. The latter are positioned against the workpiece opposite the joint to be welded. This patent has the same inventor, B. A. Kuder, as aforesaid U.S. Pat. No. 3,365,566. Mr. Kuder states in his U.S. Pat. No. 4,182,951 that the ceramic carrying welding backup tape assemblies of that patent are an improvement over his earlier welding backup tape, which could suffer burnthrough of the heat resistant fibrous material (i.e., the glass cloth) during heavy welding applications. This type of assembly affords improved performance over both the tape on tape assembly of U.S. Pat. No. 3,365,566 and the other, known conglomerated ceramic bead tape assemblies. However, the significantly greater costs of this design encourage the use of less expensive backup assemblies, like the first two discussed, whenever possible.

SUMMARY OF THE INVENTION

It is an object of the invention to provide a welding backup tape assembly which is relatively inexpensive to manufacture.

It is yet another object of the invention to provide a welding backup tape assembly which is easy to use.

It is yet another object of the invention to provide a welding backup tape assembly providing a relatively smooth surface to any contacted portion of the weld so as to avoid the need for post-welding surface grinding.

It is yet another object of the invention to provide a welding backup tape assembly which does not emit smoke or odors during use.

It is still a further object of the invention to provide a welding backup tape assembly with a rope filler.

It is still another object of the invention to provide a welding backup tape assembly with rope filler that is more easily and completely removed from the workpiece after use.

These and other objects are accomplished according to the invention by the provision of a welding backup tape assembly including a flexible, elongated, heat resistant ribbon; an elongated, flexible, heat resistent, fibrous rope attached to one side of the elongated, heat resistant ribbon and having an elongated, flexible, reinforcing core embedded therein; and pressure sensitive adhesive layers on the one side of the heat resistant ribbon supporting the rope to either side of the rope. Preferably, a metallic core reinforces to fibrous rope, providing an element of the tape that may be securely gripped and pulled when removing the assembly from a workpiece without pulling the rope apart or from the foil. The metallic core may also protect the rope to some degree by conducting heat away from hot spot(s) along the rope.

According to one important aspect of the invention, the rope core comprises a multiplicity of continuous, reinforcement strands, preferably wires knitted for providing a surface for engaging with the fibrous material sleeve and preferably stainless steel wire for strength.

According to yet another important aspect of the invention, the fibrous sheath of the rope is also preferably knitted from glass fiber yarns, preferably textured, untwisted filament yarns, for better engagement with the knitted metallic core.

These and other important aspects of the invention will be seen from an examination of the accompanying figures and detailed description of the invention.

DETAILED DESCRIPTION OF THE INVENTION

Figure 1:
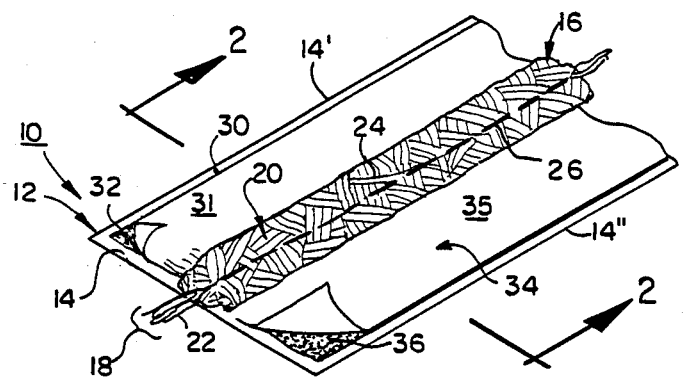
FIG. 1 depicts, in a diagrammatic perspective view, a preferred embodiment welding backup tape assembly of the invention.
Figure 2:
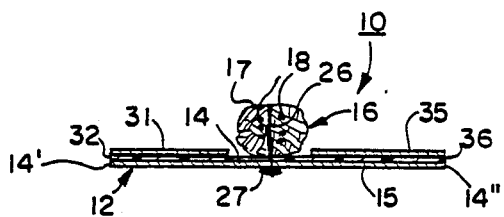
FIG. 2 is a cross section of the embodiment of FIG. 1 along the lines 2—2.

FIGS. 1 and 2 depict, in varying views, a preferred embodiment welding backup tape assembly of the invention, indicated generally as 10. The assembly 10 includes a flexible, elongated, continuous heat resistant, ribbon or strip 12, preferably a metal foil, bearing on the center of one major planar side 14 thereof a flexible elongated heat resistent fibrous rope 16. The rope 16 is composite and includes a flexible, elongated, reinforcing core 18 embedded in a surrounding tubular, flexible, heat resistant fibrous material sheath 20. Desirably, the core 18 is formed from a multiplicity of individual metal wires 22 which are preferably loosely knitted together. Desirably, the sheath 20 is formed from glass fiber in a suitable form such as yarn. A multiplicity of glass fiber yarns 24 are also preferably knitted around the knitted wire core 18 to complete the rope 16. The rope 16 is attached to the metal foil ribbon 12 by a thread 26 of glass fibers stitched in loops extending entirely through the rope 16 and foil 12 from the upper exposed or distal side 17 of the rope 16 to an opposing major planar side 15 of the flexible foil ribbon 12 (see FIG. 2). A second glass fiber thread 27 is chain stitched with looping thread 26 (again see FIG. 2). A pair of continuous, elongated, flexible backer strips 30 and 34, each formed by a continuous sheet of treated paper 31, 35 carrying a pressure sensitive adhesive layer 32, 36, respectively, are applied to the one major side 14 of the metallic ribbon 12 near either side edge 14', 14" of the ribbon to either side of the rope 16. When the paper sheets 31, 35 of the backers 30, 34 are removed from ribbon 12, the adhesive layers 32 and 36 remain on the upper surface 14.

Preferably, the tape assembly 10 is manufactured by first knitting a multiplicity (e.g., three) stainless steel wires 22 into an elongated, continuous core piece 18 and thereafter knitting a multiplicity of glass fiber yarns 24 (e.g., six) around the wire core piece 18. The backer strips 30 and 34, carrying the pressure adhesive layers, 32, 36, respectively, are applied to the one major side 14 of the metal foil ribbon 12 near either side edge of the ribbon 12. A continuous length of the knitted rope 16 is then centered against one major side 14 of a continuous metal foil ribbon 12 and sewn between the backers 30, 34 to the metal foil ribbon 12 by the pair of threads 26 and 27. The backers 30, 34 may be applied to the strip 12 after the rope is sewn to the metal foil ribbon, if desired.

Figure 3:
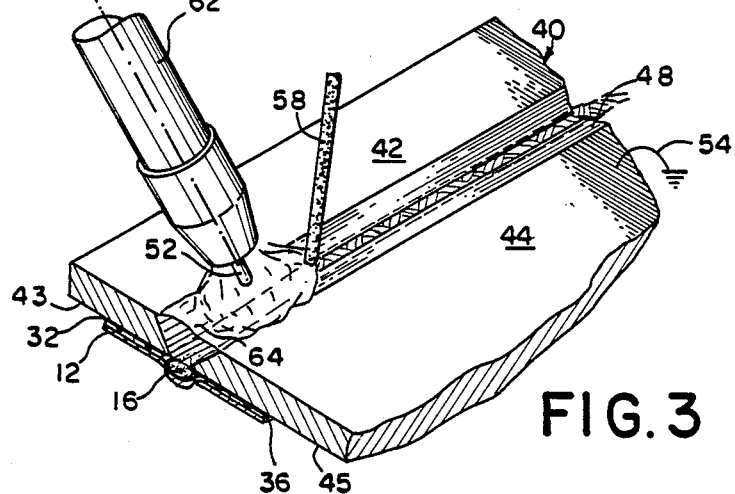
FIG. 3 depicts diagrammatically an exemplary use of the backup tape assembly of FIGS. 1 and 2 on a workpiece formed by a pair of adjoining plates.

FIG. 3 depicts one of the many possible conventional applications of the backup tape assembly 10 of FIGS. 1 and 2. In FIG. 3, a weldable workpiece 40 is provided by a pair of adjoining metal plates 42 and 44. The plates 42 and 44 are positioned spaced from one another, with their narrow side edges adjoining in a conventional manner so as to define a butt joint 48 therebetween. The lower major planar surfaces 43 and 45 of each member 42, 44, respectively, are cleaned of dirt, scale, oil, etc., in a conventional manner prior to the application of the tape assembly 10. The backer strip sheets 31, 35 are removed. The pressure sensitive adhesive layers 32, 36 remain adhered to the metal foil ribbon 12. The tape assembly 10 is applied with the elongated direction of the rope 12 and strip 12 parallel to the elongated direction of the joint 48 and against the major planar surfaces 43 and 45 of the plates 42 and 44 spanning the narrow portion of the joint 48. Each adhesive layer 32, 36 is pressed against one of the major planar surface 43, 45 adhering the assembly 10 to one side of the workpiece 40 and against the joint 48, sealing that side of the joint 48 from the atmosphere. The workpiece 40 is electrically connected by suitable and conventional means such as a spring clamp electrode (not depicted) to one connection of an electric arc welding power source (neither depicted) and an electrode 52, coupled with a remaining connection of the welding power source, provides the remainder of a circuit for current to pass from the welding apparatus through the workpiece 40. The circuit connections between the workpiece 40 and electrode 52 and the welding power source are indicated diagrammatically by leads 54 and 56, respectively. A welding rod 58 provides filler metal for filling the joint 48 and is melted during the passage of electric current between the electrode 52 and the workpiece 40. If desired, an inert gas 60 can be provided by conventional means, such as a hollow cylindrical shroud 62 surrounding the one electrode 52 to shield molten metal in the weld area 64 from the ambient oxidizing atmosphere. After cooling, the welding backup tape assembly 10 can be stripped from the workpiece 40 by gripping the rope 16, wire core 18 and metal foil ribbon 12 securely at one end of the assembly 10 and pulling the assembly from the workpiece 40.

The aforesaid U.S. Pat. Nos. 3,365,566 and 4,182,951 to B. A. Kuder are incorporated by reference in their entirety for their various teachings, including, but not limited to, conventional welding backup tape assembly materials, construction and application techniques, and conventional electric arc welding technology, with or without inert gas.

While a metal foil ribbon is preferred for isolation of the weld from atmosphere, one of ordinary skill in the art will appreciate that a woven glass fiber cloth might be used to support the composite fiber and wire rope of the subject invention where isolation of the weld area from the surrounding atmosphere is not important.

One of ordinary skill in the art will appreciate that, while a knitted wire core and surrounding glass fiber yarn sheath are preferred, a braided wire cord and/or braided glass fiber yarn sheath, which will have noticeably less elongation than does a knitted component rope, might be used.

Moreover, while a multi-wire core 18 of the rope 16 is preferred to foster engagement of the core with individual fibers of the surrounding glass fiber yarn sheath 20, other strong, flexible, heat resistant core elements, such as a single metal wire strand with grooves or serrations or a flexible, flattened metal strip with grooves or serrations or other surface roughening might be employed.

Lastly, although untextured no or low twist glass fiber thread is preferred for machine stitching as the material used to sew the rope 16 to the metal foil ribbon 12, other heat resistant materials such as metal wire and even non-heat resistant materials like cotton or synthetics might be employed if some surface contamination of the weld can be tolerated.

An exemplary welding backup tape assembly like the assembly 10 depicted in FIGS. 1-3 has been manufactured as follows. Three stainless steel wires, approximatley 0.006 inches diameter, were woven together in a warp knit. Six texturized, non-twisted glass fiber yarns were woven in a warp knit around the knitted stainless steel wire core to provide a flexible cord approximately 0.25 inches in diameter. It is believed that the texturized, non-twisted yarn, which has a very "bumpy" appearance, engages more readily with the knitted stainless steel wires than do non-texturized, twisted fiberglass yarns. The texturized yarns were sized approximately 175 to 275 yards per pound. Yarns running approximately 110 to 600 yards per pound might also be employed depending on the size of the ultimate rope diameter desired. The resulting cord or rope was sewn to the center of a major side of a continuous, elongated aluminum foil strip approximately 0.002 inches thick and 2 inches wide. A pair of low twist, continuous, multi-filament glass fiber threads, approximately 0.012 inches in diameter, were used to chain stitch the rope or cord to the foil ribbon. Release paper backers carrying a pressure sensitive acrylic adhesive, such as are commercially available from a variety of sources including Avery Products, were applied to the one major side of the aluminum foil ribbon to either side of the rope, substantially covering the surface of the ribbon between the rope and the side edge of the ribbon. The acrylic adhesive is preferred as it appears to provide better adhesion to the metal workpieces on which the product is typically used, and to generate less fumes when heated than do latex adhesives, which might alternately be employed.

Although a preferred embodiment has been described and various modifications thereto suggested, the invention is not limited to the preferred embodiment or the suggested modifications, but is rather defined by the accompanying claims.

I claim:

1. A welding backup tape assembly comprising: a length of flexible, elongated, heat resistant ribbon; a length of flexible elongated heat resistant fibrous rope on one side of the elongated, heat resistant ribbon; flexible, elongate, heat resistant core means comprising a multiplicity of continuous reinforcement strands extending the length of the rope, embedded in the flexible elongated heat resistant, fibrous rope for reinforcing said rope; adhesive layer means on the one side of the ribbon for attaching said one side of the assembly to a workpiece; and stitching means extending through the rope and through the ribbon for sewing the rope to the ribbon.

2. The assembly of claim 1 wherein said rope comprises a multiplicity of yarns of textured, non-twisted, continuous glass fibers.

3. The assembly of claim 1 wherein said rope comprises a multiplicity of glass fiber yarns knitted together.

4. The assembly of claim 1 wherein said core means comprises a multiplicity of flexible reinforcement strands knitted together.

5. The assembly of claim 1 wherein said stitching means comprises a thread of untextured glass fiber filaments.

6. The assembly of claim 1 wherein said rope comprises a multiplicity of glass fiber yarns knitted together.

7. The assembly of claim 6 wherein said core means comprises a multiplicity of stainless steel wires knitted together.

8. The assembly of claim 7 wherein said yarns are texturized and essentially untwisted.

9. The assembly of claim 8 wherein said thread is essentially untexturized.

10. The assembly of claim 9 further comprising a second thread chain stitched with the thread.

11. A welding backup tape assembly comprising: a length of metallic foil ribbon; a length of heat resistant rope including a glass fiber sheath surrounding a flexible, metallic core, the rope being attached to one side of the metallic foil ribbon; adhesive layer means on said one side of the metallic foil ribbon for attaching said one side of said ribbon to a workpiece; and stitching means for attaching said metallic foil ribbon and said heat resistant rope together.

12. A welding backup tape assembly comprising: a length of flexible, elongated, heat resistant ribbon; a length of flexible elongated, refractory fibrous rope on one side of the elongated ribbon; a flexible, elongated, metallic core means embedded in the refractory fibrous rope for reinforcing said rope; adhesive layer means on the one side of the ribbon for attaching the assembly to a workpiece; and a refractory fiber thread extending through the rope and ribbon stitching the rope to the ribbon.

13. The assembly of claim 12 wherein the flexible, elongated core means comprises a multiplicity of metal wires.

14. The assembly of claim 13 wherein the ribbon is formed from metallic foil.

15. The assembly of claim 14 wherein the refractory fiber of the rope and the thread are glass fibers.

* * * * *